(12) United States Patent
Hinds et al.

(10) Patent No.: US 7,599,974 B2  
(45) Date of Patent: Oct. 6, 2009

(54) DATA PROCESSING APPARATUS AND METHOD FOR COMPARING FLOATING POINT OPERANDS

(75) Inventors: Christopher Neal Hinds, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 1076 days.

(21) Appl. No.: 10/805,502

(22) Filed: Mar. 22, 2004

(65) Prior Publication Data

US 2005/0210093 A1    Sep. 22, 2005

(51) Int. Cl.
  *G06F 7/00* (2006.01)
(52) U.S. Cl. ....................................................... 708/200
(58) Field of Classification Search .......... 708/200–209  
  See application file for complete search history.

(56) References Cited

U.S. PATENT DOCUMENTS

| | | | |
|---|---|---|---|
| 4,918,636 A * | 4/1990 | Iwata et al. | 708/207 |
| 5,339,266 A * | 8/1994 | Hinds et al. | 708/495 |
| 6,298,365 B1 * | 10/2001 | Dubey et al. | 708/495 |
| 6,581,087 B1 * | 6/2003 | Inoue et al. | 708/671 |
| 6,633,895 B1 * | 10/2003 | Bass et al. | 708/498 |
| 6,779,013 B2 * | 8/2004 | Pangal | 708/503 |
| 6,789,098 B1 * | 9/2004 | Dijkstra | 708/495 |
| 2003/0154227 A1 * | 8/2003 | Howard et al. | 708/495 |
| 2005/0210086 A1 * | 9/2005 | Lutz et al. | 708/200 |

* cited by examiner

*Primary Examiner*—Chat C Do  
(74) *Attorney, Agent, or Firm*—Nixon & Vanderhye P.C.

(57) ABSTRACT

A data processing apparatus compares first and second floating point operands to produce a comparison result. For each floating point operand, a first component is derived from a predetermined number of MSBs of the fraction component which is less than the total number of bits constituting the fraction component. The sign and exponent components of the first and second floating point operands are compared to produce a plurality of signals. If possible, the comparison result is determined from the plurality of signals. For each floating point operand, a second component is derived from the bits of the fraction component of that floating point operand other than the predetermined number of MSBs. The second components of the first and second floating point operands to are compared produce a further signal. The comparison result is determined from the plurality of signals and the further signal.

28 Claims, 6 Drawing Sheets

| Notes on CodeAnalysis | | | | | | | | | | | | |
|---|---|---|---|---|---|---|---|---|---|---|---|---|
| Compare instruction | | | | | | | | | | | | |
| Application | Precision | Sign | Exp | U1 | U2 | U3 | U4 | U5 | U6 | U7 | U8 | U8++ | Total |
| mesa | DP | 0 | 4094 | 12 | 0 | 0 | 0 | 0 | 0 | 0 | 0 | 0 | 4106 |
| | | 0.00% | 99.71% | 0.29% | 0.00% | 0.00% | 0.00% | 0.00% | 0.00% | 0.00% | 0.00% | 0.00% | 100.00% |
| mesa | SP | 17 | 44 | 39 | 0 | 0 | 0 | 0 | 0 | 0 | 0 | 0 | 100 |
| | | 17.00% | 44.00% | 39.00% | 0.00% | 0.00% | 0.00% | 0.00% | 0.00% | 0.00% | 0.00% | 0.00% | 100.00% |
| art (scanne | DP | 653342 | 13611054 | 6190101 | 2668473 | 285229 | 368490 | 201619 | 171738 | 16920 | 15480 | 570011 | 24752457 |
| | | 2.64% | 54.99% | 25.01% | 10.78% | 1.15% | 1.49% | 0.81% | 0.69% | 0.07% | 0.06% | 2.30% | 100.00% |
| quake | DP | 5 | 1461380 | 391 | 887 | 454 | 48 | 23 | 17 | 3 | 3 | 4 | 1463215 |
| | | 0.00% | 99.87% | 0.03% | 0.06% | 0.03% | 0.00% | 0.00% | 0.00% | 0.00% | 0.00% | 0.00% | 100.00% |
| Total count | | 653364 | 15076572 | 6190543 | 2669360 | 285683 | 368538 | 201642 | 171755 | 16923 | 15483 | 570015 | 26219878 |
| Total percentage | | 2.49% | 57.50% | 23.61% | 10.18% | 1.09% | 1.41% | 0.77% | 0.66% | 0.06% | 0.06% | 2.17% | 100.00% |
| Cumulative percentage | | 2.49% | 59.99% | 83.60% | 93.78% | 94.87% | 96.28% | 97.05% | 97.70% | 97.77% | 97.83% | 100.00% | |

Fig. 4

| SDiff | SAgtB | EDiff | AeMax | BeMax | EZero | EAgtB | sFDiff | sFAgtB | AfZero | BfZero | cFAgtB | Equal | GT | LT | UN | Case |
|---|---|---|---|---|---|---|---|---|---|---|---|---|---|---|---|---|
| x | x | x | x | x | x | x | x | x | x | x | x | 0 | 0 | 0 | 1 | NaN - Unordered |
| x | x | x | x | 1 | x | x | x | x | x | 0 | x | 0 | 0 | 0 | 1 | NaN - Unordered |
| x | x | x | 0 | 0 | 1 | x | x | x | 1 | 1 | x | 1 | 0 | 0 | 0 | Zeros |
| 0 | x | x | x | x | x | x | x | x | 1 | 1 | x | 1 | 0 | 0 | 0 | Like-signed infinities |
| 1 | 0 | x | x | x | x | x | x | x | x | x | x | 0 | 0 | 1 | 0 | Sign – A (-), B (+) |
| 1 | 1 | x | x | x | x | x | x | x | x | x | x | 0 | 1 | 0 | 0 | Sign – A (+), B (-) |
| 0 | x | 1 | † | † | x | 0 | x | x | x | x | x | 0 | 0 | 1 | 0 | Signs same, Be > Ae |
| 0 | x | 1 | † | † | x | 1 | x | x | x | x | x | 0 | 1 | 0 | 0 | Signs same, Ae > Be |
| 0 | x | 0 | † | † | x | x | 0 | 0 | x | x | x | 0 | 0 | 1 | 0 | S, E same, Bsf > AsF |
| 0 | x | 0 | † | † | x | x | 0 | 1 | x | x | x | 0 | 1 | 0 | 0 | S, E same, Asf > BsF |
| 0 | x | 0 | † | † | x | x | † | x | x | x | * | 0 | 0 | 0 | 0 | Full comp required |

† Exp may be max only when the value of the operand is infinity.
* In this case, the fractions must be compared fully. The signal cFAgtB with an zero detection on the difference (registered in Operand B in N5) is required to resolve the comparison.

| cFAgtB | Difference (A-B) | Case(A,B > 0) | Case(A,B < 0) | Case (A==B) |
|---|---|---|---|---|
| 0 | Not zero | LT (B > A) | GT (A > B) | GT (A > B) |
| 1 | Not zero | GT (A > B) | LT (B > A) | LT (B > A) |
| x | Zero | EQ (A==B) | EQ (A==B) | EQ (A==B) |

Fig. 5

DATA PROCESSING APPARATUS AND METHOD FOR COMPARING FLOATING POINT OPERANDS

TECHNICAL FIELD

The present invention relates to a data processing apparatus and method for comparing floating point operands.

BACKGROUND

A floating point number can be expressed as follows:

$$\pm 1.x * 2^y$$

where: x=fraction
1.x=significand (also known as the mantissa)
y=exponent

A floating point number hence consists of three components, namely a sign component, an exponent component and a fraction component (which can be converted to a significand component). The sign component is typically a 1-bit field, which is set to "0" for a positive number, and to "1" for a negative number. The number of bits used for the exponent component and fraction component will vary depending on whether the floating point numbers are single precision numbers or double precision numbers, but can be given by the following table:

TABLE 1

| Precision | Number of bits in exponent | Exponent bias | Number of bits in fraction |
|---|---|---|---|
| Single | 8 | +127 | 23 |
| Single-extended | >=11 | Unspecified | >=31 |
| Double | 11 | +1023 | 52 |
| Double-extended | >=15 | unspecified | >=63 |

A number of known techniques have been used for comparing two floating point operands to determine which operand is larger. A first known technique involves the comparison of the complete operands (with the exception of the sign bits) in the format specified in Table 1 above, with special handling for NaNs (Not-a-Number values).

This technique is used to determine which operand is larger in situations where both floating point operands are of the same sign, and takes advantage of the fact that two floating point values with the same sign may be compared as unsigned 2's complement integers for equality and relative magnitude. This fails only for NaNs, which must compare as unordered and not relative to non-NaN values.

Logic to perform this comparison may take several forms. FIG. 1 illustrates one such form of logic, in which two adders 30, 40 are used. Bits [n-2:0] of the n-bit floating point operand A 10 (i.e. all bits other than the sign bit) are passed directly to one input of adder 30 whilst bits [n-2:0] of the other operand B 20 are negated prior to supply to the other input of this adder 30. The second adder 40 in contrast takes as inputs A[n-2:0] negated and B[n-2:0] without negation. Both adders have the carry-in bit set, and the relative magnitude and equality may be determined form the carry-out bits of both adders (labelled AgtB and BgtA in FIG. 1) according to the following table:

TABLE 2

| Condition | A + ~B + 1 | ~A + B + 1 |
|---|---|---|
| A == B | 10000 . . . 0000 | 10000 . . . 0000 |
| A > B if signs positive<br>B > A if signs negative | 1δ, δ != 0 | 0β, β != 0 |
| A < B if signs positive<br>B < A if signs negative | 0δ, δ != 0 | 1β, β != 0 |

In the above table, the far left bit in the centre column is the AgtB indication and the far left bit in the right column is the BgtA indication. The following code segment illustrates how the result of the comparison operation is determined based on these two indications:

if (AgtB and BgtA) A and B are equal
if (sign is positive)
    if (AgtB and ~BgtA) A is greater than B
    else B is greater than A
else (sign is negative)
    if (AgtB and ~BgtA) B is greater than A (it is less negative, hence greater in absolute magnitude)
    else A is greater than B Hence, when the floating point operands both have positive signs, if the carry-out bit AgtB from adder 30 is set (i.e. has a logic 1 value), and the carry-out bit BgtA from adder 40 is not set (i.e. has a logic 0 value), this indicates that operand A is greater than operand B, whilst if the carry-out bit AgtB from adder 30 is not set, and the carry-out bit BgtA from adder 40 is set, this indicates that operand B is greater than operand A. Alternatively, when the floating point operands both have negative signs, then if the carry-out bit AgtB from adder 30 is set (i.e. has a logic 1 value), and the carry-out bit BgtA from adder 40 is not set (i.e. has a logic 0 value), this indicates that operand B is greater than operand A, whilst if the carry-out bit AgtB from adder 30 is not set, and the carry-out bit BgtA from adder 40 is set, this indicates that operand A is greater than operand B.

If both AgtB and BgtA are set then, irrespective of whether the signs are positive or negative, this indicates that the operands A and B are equal.

Sign evaluation and NaN detection must be performed on the input operands. If either operand is a NaN the result is only UNORDERED, not equal (regardless of the fraction of the NaN or NaNs) and no other comparison is valid. If the signs are different and neither operand is a NaN the result will be GREATERTHAN or LESSTHAN, and no further comparison of bits is required. This detection can be performed in parallel with the additions discussed above with reference to FIG. 1, and used to override the final compare results. Logic combines the NaN detection and the AgtB and BgtA signals to produce the comparison result.

An alternative prior art technique to that described above with reference to FIG. 1 considers each component of the operands independently. Hence, in accordance with this technique the signs, exponents and fractions (or significands) are considered independently. The following sequence of operations illustrates this method (assuming the outputs are UNORDERED, EQUAL, GREATERTHAN, and LESSTHAN):

if (AisNaN|BisNaN)
    A or B is NaN, only UNORDERED is signalled
    signal UNORDERED
else if (AisZero & BisZero)
    A and B are zeros, compare is equal regardless of signs
    signal EQUAL

```
else if (~Asign & Bsign)
    A is greater than B by virtue of signs (A is positive and B is
        negative)
    signal GREATERTHAN
else if (Asign & ~Bsign)
    A is less than B by virtue of signs (A is negative and B is
        positive)
    signal LESSTHAN
else if (Aexp>Bexp)
    A is greater than B by virtue of exponent
    signal GREATERTHAN
else if (Bexp>Aexp)
    A is less than B by virtue of exponents
    signal LESSTHAN
else if (Afraction>Bfraction)
    A is greater than B by virtue of fractions
    signal GREATERTHAN
else if (Bfraction>Afraction)
    A is less than B by virtue of fractions
    signal LESSTHAN
else
    A and B are equal by virtue of sign, exponent and fraction
    signal EQUAL
```

As can be seen from FIG. 2, the sign bits Asign and Bsign pass directly to the comparison evaluation block. Exponent evaluation block 110 detects whether either exponent is zero or is a maximum value and produces signals indicative of that analysis. Adder 115 receives the exponent of operand A and the negated version of the exponent of operand B and adds these values together with a carry-in of +1, such that the carry-out from the adder 115 indicates whether the exponent of A is greater than the exponent of B. Adder 120 performs a similar computation but with the exponent of operand A negated and the exponent of operand B not negated, and hence produces a carry-out signal indicating whether the exponent of B is great than the exponent of A. Adders 130 and 135 operate in a analogous manner to adders 115 and 120, but receive the fraction components as inputs instead of the exponent components, and hence produce one output indicating whether the fraction of operand A is greater than the fraction of operand B, and another output indicating whether the fraction of operand B is greater than the fraction of operand A. Finally, logic 125 detects whether either fraction is zero and outputs signals indicative of that analysis.

The comparison evaluation logic block 140 receives all of the above mentioned signals as illustrated in FIG. 2 and performs the evaluation of those signals in accordance with the logic flow above.

Both of the prior art techniques discussed above with reference to FIGS. 1 and 2 are useful ways of implementing a floating point comparison operation in a pipelined processor in which the comparison must be performed fully in a fixed number of stages. However, in some situations, the requirement for the comparison to be performed fully in a fixed number of stages can be removed, and in such situations it would be desirable to provide an improved technique for comparing floating point operands which consumes less power and/or produces the comparison result more quickly.

SUMMARY OF THE INVENTION

Viewed from a first aspect, the present invention provides a data processing apparatus for comparing first and second floating point operands to produce a comparison result, each first and second floating point operand having a sign component, an exponent component and a fraction component, the data processing apparatus comprising: first processing logic operable to receive, for each floating point operand, a first component derived from a predetermined number of most significant bits of the fraction component of that floating point operand, said predetermined number being less than the total number of bits constituting the fraction component, the first processing logic being further operable to receive the sign components and the exponent components of the first and second floating point operands, to compare the sign components, the exponent components and the first components of the first and second floating point operands, and to produce a plurality of signals indicative of the comparison; evaluation logic operable to evaluate whether the comparison result can be determined from the plurality of signals, and if so, to determine the comparison result; second processing logic operable, in the event that the evaluation logic determines that the comparison result cannot be determined from the plurality of signals, to receive, for each floating point operand, a second component derived from at least the bits of the fraction component of that floating point operand other than said predetermined number of most significant bits, and to compare the second components of the first and second floating point operands in order to produce at least one further signal indicative of said comparison; and the evaluation logic being further operable to determine the comparison result from said plurality of signals and said at least one further signal.

The comparison of the first and second floating point operands to produce a comparison result is performed in two discrete steps, with the second step only being exercised if necessary. In particular, the second step is only performed when the comparison is not conclusively determined during the first step.

More particularly, the data processing apparatus provides first processing logic which is operable to compare the sign components, the exponent components, and the first components of the first and second floating point operands in order to produce a plurality of signals indicative of the comparison. With regard to the first component of each operand, this is derived from a predetermined number of most significant bits of the fraction component of that floating point operand, where this predetermined number is less than the entirety of the bits constituting the fraction component. Hence, in other words, it can be seen that the first component is derived from a certain number of most significant bits of the fraction component.

Evaluation logic is then provided to evaluate whether the comparison result can be determined from the plurality of signals produced by the first processing logic, and if so the comparison result is determined. The inventors of the present invention have realised that in a very large proportion of cases, it is possible to determine the comparison result without needing to compare the entirety of the bits of the fraction component, and accordingly by comparing the sign component, exponent component and first component of each floating point operand, sufficient information is produced to enable the evaluation logic to determine the comparison result in most situations.

However, to cover situations where the evaluation logic is not able to determine the comparison result solely from the plurality of signals produced by the first processing logic, second processing logic is provided which in the event that the comparison result cannot be determined as a result of the signals produced by the first processing logic, compares a second component of the first floating point operand with a second component of the second floating point operand in order to produce at least one further signal indicative of the comparison. This second component of each operand is derived from at least the bits of the fraction component of that operand that have not been used in the derivation of the first component. Provided with this at least one further signal, the evaluation logic is then able to determine the comparison result from the plurality of signals produced by the first processing logic and this at least one further signal produced by the second processing logic.

Hence, by using this technology, significant power savings can be realised, since the second processing logic only needs to be used if the comparison result cannot be determined as a result of the plurality of signals produced by the first processing logic. Further, since in a large proportion of cases the comparison result can be determined purely from the signals produced by the first processing logic, the technique of the present invention enables the comparison result to be produced significantly more quickly in a system that requires additional time for the comparison performed by the second processing logic.

The technique is particularly useful in data processing apparatus designs that are microcoded (as opposed to pipelined), since in such designs an operation may take a variable number of cycles, with particular pieces of logic being enabled as and when required. Hence, in such designs, the second processing logic can be arranged to only be enabled if it is actually required, i.e. if the evaluation logic is unable to determine the comparison result as a result of the signals produced by the first processing logic.

In addition to use in microcoded processor designs, it will be appreciated that the technology may also have applicability in other designs, provided that there is not a requirement for the result of the comparison to be performed fully in a fixed number of clock cycles. However, for the power saving potential of the present invention to be fully realised, the design would need to allow the second processing logic to be selectively enabled/disabled dependent on whether the use of that second processing logic was required for any particular comparison.

It will be appreciated that the first component may take a variety of forms. However, in one embodiment, for each operand, said first component comprises said predetermined number of most significant bits of the fraction component of that floating point operand. In an alternative embodiment, for each operand, the first component comprises a number of most significant bits of a significand derived from said predetermined number of most significant bits of the fraction component.

Similarly, it will be appreciated that the second component can take a variety of forms. Accordingly, in one embodiment, for each operand, said second component comprises said at least the bits of the fraction component of that floating point operand other than said predetermined number of most significant bits. In an alternative embodiment, for each operand, said second component comprises a number of bits of a significand derived from said at least the bits of the fraction component of that floating point operand other than said predetermined number of most significant bits.

The number of bits used in the derivation of the second component can vary provided that that derivation is based on at least the bits of the fraction component that have not been used in the derivation of the first component. However, in one embodiment, for each floating point operand, the second component is derived from all bits of the fraction component of that floating point operand. Hence, the second processing logic is operable to compare second components of the first and second floating point operands that are derived from all bits of the fraction components, and accordingly by way of example the second processing logic may be arranged to compare the entirety of the fraction of the first floating point operand with the entirety of the fraction of the second floating point operand, or to compare the entire significands of the first and second floating point operands as derived from the entire fraction components.

It will be appreciated that the first and second operands can have any arbitrary floating point values that it is desired to compare against one another. However, in one embodiment, the second floating point operand is zero, and the plurality of signals produced by the first processing logic are sufficient to enable the evaluation logic to determine the comparison result. Hence, in such embodiments, an input floating point operand can be compared against zero, with the first processing logic producing a plurality of signals which will always be sufficient to enable the evaluation logic to determine the comparison result without the need to use the second processing logic. Hence, in such situations, the comparison result can be produced both quickly, and with reduced power consumption, when compared to the known prior art techniques.

An exponent component of a floating point operand will typically have a bias value associated therewith so as to enable a range of negative and positive exponents to be specified. Whilst in one embodiment the exponent components of the first and second floating point operands as compared by the first processing logic are the original exponent components of the first and second floating point operands as received by the data processing apparatus, this is not essential. In particular, in an alternative embodiment, the exponent component of each floating point operand as compared by the first processing logic has a modified bias value associated therewith which is modified with respect to an original bias value associated with the exponent component as received by the data processing apparatus. Hence, in accordance with such embodiments, the bias can be entirely removed prior to comparison of the exponents by the first processing logic, or indeed a different bias value can be associated with the exponent components prior to their comparison by the first processing logic.

It will be appreciated that the first processing logic can be constructed in a variety of ways. However, in one embodiment, the first processing logic comprises sign evaluation logic operable to produce a first sign signal which is set if the sign components of the first and second floating point operands are different, and a second sign signal indicating, in the event that the first sign signal is set, which sign component is positive. The evaluation logic can then derive required information about the comparison of the signs based on this pair of signals. In one embodiment, if the first sign signal is not set (i.e. the signs of the operands are identical), then the second sign signal directly indicates the value of the sign components of the floating point operands.

In one embodiment, the first processing logic comprises exponent evaluation logic operable to produce a first exponent signal which is set if the exponent components of the first and second floating point operands are different, and a second exponent signal indicating, in the event that the first exponent signal is set, which exponent component is larger. In addition, in one embodiment, the exponent evaluation logic is further operable to produce one or more further exponent signals indicating the presence of one or more predetermined exponent conditions. This collection of signals provides the evaluation logic with all required information about the comparison of the exponents.

In one embodiment, the first processing logic comprises first component evaluation logic operable to produce a first first component signal which is set if the first components of the first and second floating point operands are different, and a second first component signal indicating, in the event that the first first component signal is set, which first component is larger. This pair of signals provides the evaluation logic with all the required information about the comparison of the first components.

In one particular embodiment, the first component evaluation logic is further operable to receive the fraction components of the first and second floating point operands and to produce one or more additional signals indicating whether either of the fraction components are zero. It should be noted that the first component evaluation logic does not perform any comparison between the full fraction components, but solely receives the full fraction components so that it can be determined whether either or both fraction components are zero. This information is useful to the evaluation logic.

In one particular embodiment, the first processing logic comprises the sign evaluation logic, exponent evaluation logic and first component evaluation logic discussed above.

It will be appreciated that the at least one further signal produced by the second processing logic can take a variety of forms. However, in one embodiment, the second processing logic is operable to produce as said at least one further signal a second component signal indicating which second component is larger. This signal, when combined with the plurality of signals produced by the first processing logic, provides the evaluation logic with the additional information it needs to enable it to determine the comparison result in situations where the plurality of signals produced by the first processing logic was insufficient for that purpose.

Viewed from a second aspect, the present invention provides a method of operating a data processing apparatus to compare first and second floating point operands to produce a comparison result, each first and second floating point operand having a sign component, an exponent component and a fraction component, the method comprising the steps of: (a) receiving at first processing logic, for each floating point operand, a first component derived from a predetermined number of most significant bits of the fraction component of that floating point operand, said predetermined number being less than the total number of bits constituting the fraction component, the first processing logic also receiving the sign components and the exponent components of the first and second floating point operands; (b) employing the first processing logic to compare the sign components, the exponent components and the first components of the first and second floating point operands, and to produce a plurality of signals indicative of the comparison; (c) evaluating whether the comparison result can be determined from the plurality of signals, and if so, determining the comparison result; (d) in the event that at said step (c) it is determined that the comparison result cannot be determined from the plurality of signals, receiving at second processing logic, for each floating point operand, a second component derived from at least the bits of the fraction component of that floating point operand other than said predetermined number of most significant bits; (e) employing the second processing logic to compare the second components of the first and second floating point operands in order to produce at least one further signal indicative of said comparison; and (f) determining the comparison result from said plurality of signals produced at said step (b) and said at least one further signal produced at said step (e).

BRIEF DESCRIPTION OF THE DRAWINGS

FIG. 4 is a table illustrating the percentage of floating point comparisons where the comparison result can be determined using only the first processing logic illustrated in FIG. 3;

FIG. 5 provides a pair of tables illustrating the evaluation performed within the evaluation logic of FIG. 3 in order to determine the comparison result.

DETAILED DESCRIPTION

Figure 1:
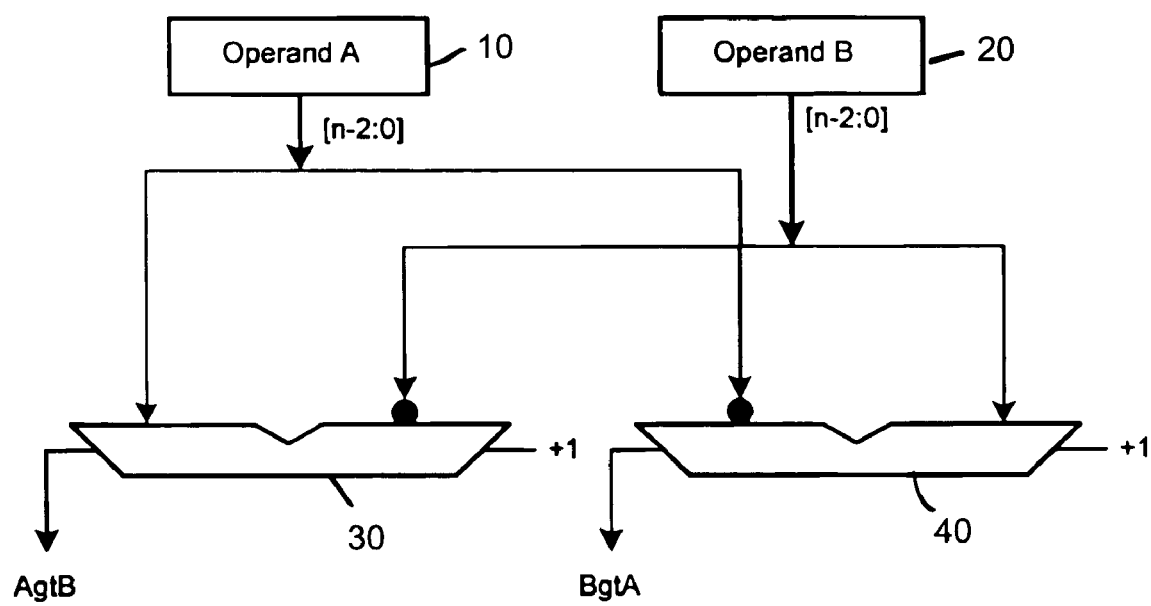
FIG. 1 is a diagram illustrating logic employed in accordance with a first known technique for comparing two floating point operands.
Figure 2:
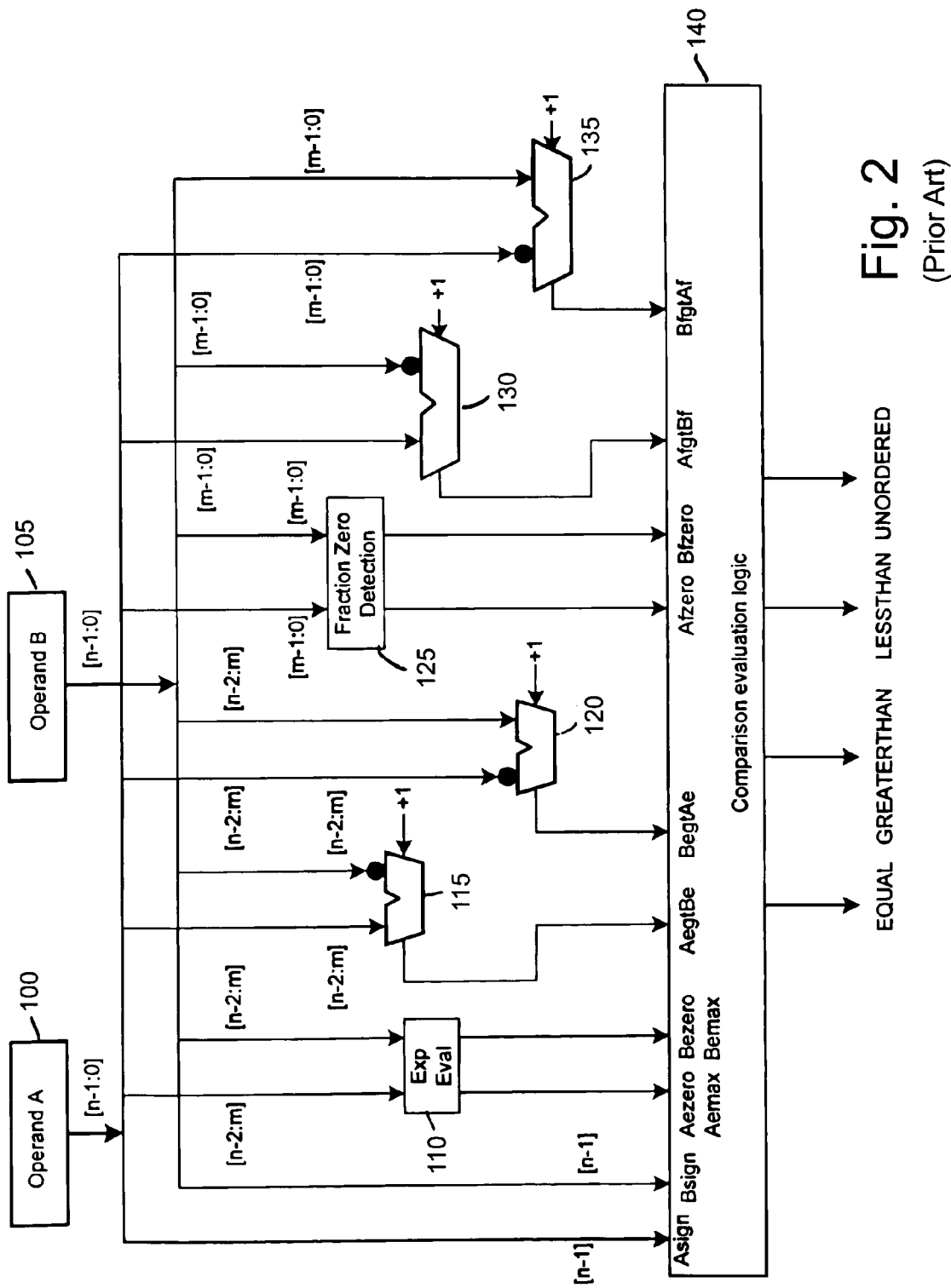
FIG. 2 is a diagram illustrating logic provided in accordance with a second known technique for comparing two floating point operands.
Figure 3:
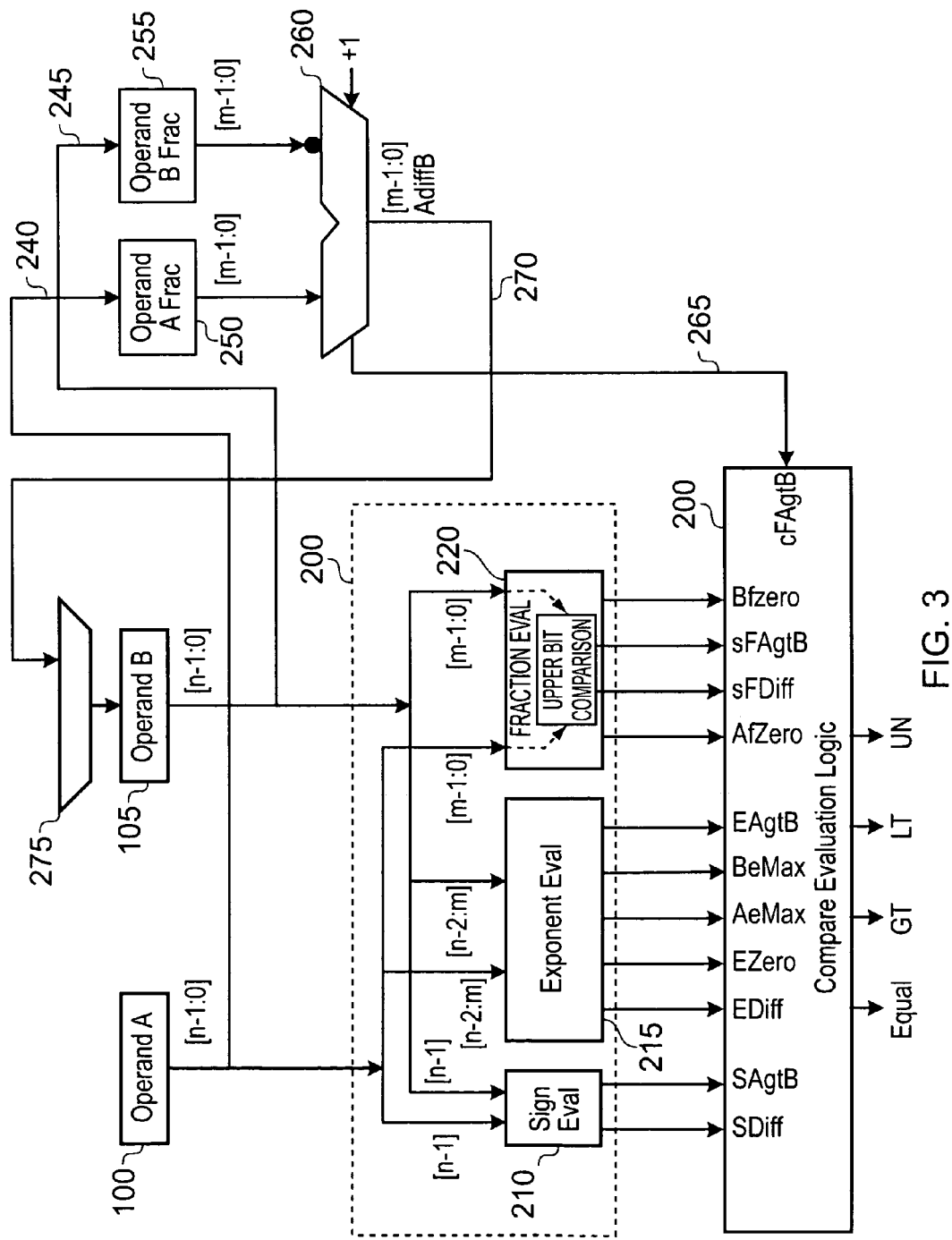
FIG. 3 is a block diagram of logic provided within a data processing apparatus in accordance with one example embodiment to compare two floating point operands.

FIG. 3 is a block diagram of logic provided within a data processing apparatus in accordance with one example embodiment to compare two floating point operands A and B. The n-bit floating point operands A and B are stored in registers 100, 105 respectively, and in a first cycle N1 are provided to first processing logic 200. The first processing logic 200 consists of sign evaluation logic 210, exponent evaluation logic 215 and fraction evaluation logic 220. The sign evaluation logic 210 is arranged to receive the sign bits of both operands and to produce output signals indicative of the comparison of those sign bits. Similarly, the exponent evaluation logic 215 is arranged to receive the exponent components of both operands A and B and to produce a number of signals based on the comparison of those exponents, and the detection of certain conditions, in particular whether the exponents of both operands are zero, whether the exponent of A is maximum, or whether the exponent of B is maximum.

The fraction evaluation logic 220 is arranged to receive the fraction components of the first and second operands 100 and 105 and is arranged to determine whether either of the fraction components is zero, signals being output indicating whether the fraction of A is zero and/or the fraction of B is zero. However, from the point-of-view of the comparison performed by the fraction evaluation logic 220, the fraction evaluation logic 220 is arranged to only compare a number of most significant bits of the fraction components of the operands A and B rather than comparing the entirety of the fraction components against one another. When compared against an equivalent piece of logic which would be able to compare the entirety of the fraction components against one another, the fraction evaluation logic 220 consumes significantly less power and can operate relatively more quickly.

The meanings of the various signals output by the sign evaluation logic 210, exponent evaluation logic 215 and fraction evaluation logic 220 of the first processing logic 200, and the signal produced by the second processing logic 260, are as follows:

SDiff—true if the signs are not equal

SAgtB—if SDiff is true, this signal is true if the sign of A is zero and B is true (i.e. A is positive, B is negative)
    if SDiff is not true, this signal is set to the value of the sign bits of A and B, which must be identical if SDiff is not true (i.e. 0 if A and B are positive, 1 if A and B are negative)

EDiff—true if the exponents are not equal

EZero—true if the exponents of both operands are zero

AeMax—true if the exponent of A is maximum

BeMax—true if the exponent of B is maximum

EAgtB—true if the A exponent is greater (signed) than the B exponent

Afzero—full operand A fraction is zero

Bfzero—full operand B fraction is zero sFDiff—true if the short length comparison of the upper bits of A and B are different sFAgtB—true if the upper fraction bits of A are greater in magnitude than the upper bits of B cFAgtB—true if the complete fraction bits of A are greater in magnitude than the complete fraction bits of B Once the various signals have been output by the first processing logic 200 in cycle N1, the compare evaluation logic 230 is then arranged in a second clock cycle N2 to evaluate the various signals received from the first processing logic 200 in order to evaluate whether the comparison result can be determined, and if so to output the comparison result by setting one of four possible flags, namely an equal flag, a greater than flag, a less than flag, or an unordered flag. The manner in which the compare evaluation logic 230 evaluates the various signals produced by the first processing logic 200 is illustrated in the upper table of FIG. 5. In the upper table of FIG. 5 an "x" denotes a "don't care" condition. Accordingly, by way of example, if the signal AeMax is set, indicating that the exponent of A is a maximum value, and at the same time the signal Afzero is not set, indicating that the full fraction of A is non-zero, this indicates the presence of an unordered operand, and accordingly the unordered flag should be set irrespective of the values of the other signals. A similar condition with regard to the operand B can be detected using the BeMax signals and Bfzero signals.

As will be appreciated from FIG. 5, it can be seen that in all instances other than that illustrated by the last entry in the upper table of FIG. 5, the compare evaluation logic 230 is able to determine the comparison result purely from the signals output by the first processing logic 200. Accordingly, the appropriate flag can be set, and the comparison result hence written to a status register in a third clock cycle N3.

If however the situation indicated by the last entry in the upper table of FIG. 5 is determined to exist, then in the clock cycle N3 the fraction components of the first and second operands are latched in the registers 250, 255 respectively by being routed from registers 100, 105 over paths 240, 245 respectively. It will be appreciated that as an alternative to storing the fraction components in these registers, the significand components could alternatively be stored if desired.

In the next clock cycle N4, the difference between the fractions (or significands) is determined by the adder 260 which is arranged to add the output from register 250 to the inverted version of the output from register 255, with a carry-in value of +1. The generated difference value is then passed over path 270 and via multiplexer 275 for latching in the register 105. In addition, a carry-out signal cFAgtB is output from the adder 260 over path 265 to the compare evaluation logic 230.

In the next clock cycle N5, the comparison evaluation logic 230 is then arranged to determine the comparison result based on the signal received over path 265 and the various signals received from the first processing logic in clock cycle N1, whilst in addition the difference stored in the operand B register 105 is checked for a zero. As can be seen from the lower table of FIG. 5, if the difference stored in the operand B register 105 is zero, then the comparison evaluation logic 230 sets the equal flag irrespective of the value of the signal cFAgtB.

However, assuming that the difference latched in the operand B register 105 is not zero, then if the operands are positive the setting of the cFAgtB signal to a logic one value, in combination with the values of the signals output from the first processing logic 200 as indicated by the last entry in the upper table of FIG. 5, will indicate that the floating point operand A is greater than the floating point operand B, and that accordingly the greater than flag should be set, whilst if the cFAgtB signal is not set then this will indicate that the operand B is greater than the operand A, and that accordingly the less than flag should be set.

Alternatively, if the operands are negative the setting of the cFAgtB signal to a logic one value, in combination with the values of the signals output from the first processing logic 200 as indicated by the last entry in the upper table of FIG. 5, will indicate that the floating point operand B is greater than the floating point operand A, and that accordingly the less than flag should be set, whilst if the cFAgtB signal is not set then this will indicate that the operand A is greater than the operand B, and that accordingly the greater than flag should be set.

Following this determination, the comparison result is then written to a status register in the next clock cycle N6.

Hence, in summary, it will be seen that a comparison which can be resolved based on the sign component, exponent component and a certain number of most significant bits of the fraction component will require three cycles in order to write the comparison result into the status register, whilst if a full difference of the fractions is required in order to determine the comparison result, the status register will be written in six cycles.

FIG. 4 provides a table showing the percentage of floating point comparisons that require only the component comparison operations listed. In the "Application" column several publicly available floating point intensive applications are identified, whilst in the "Precision" column an indication is given as to whether double precision (DP) or single precision (SP) floating point operands are being compared. In the "Sign" column is an indication of the percentage of comparisons which could be resolved only by the sign bit. The "Exponent" column provides an indication of the percentage of cases which had the same sign bits, but which could be resolved by the exponent bits. The remaining columns show the percentage of cases which had equal sign and exponent components, but differed by the number of most significant fraction bits shown in the column headings (U1 representing the most significant fraction bit, U2 representing the most significant two fraction bits, etc).

As can be seen from the table of FIG. 4, for 97.83% of cases, the comparison result can be determined based solely on the sign component, exponent component and the upper eight significant bits of the fraction component, and accordingly significant speed and power savings can be achieved by using the logic of FIG. 3 and arranging the fraction evaluation logic 220 to only compare the upper eight bits of the fraction, since then in nearly 98% of cases, the comparison result can be detected by the compare evaluation logic 230 in the third clock cycle based on the outputs of the first processing logic 200, and accordingly there is no need for the values to then be latched in the registers 250, 255, nor for the adder 260 to be enabled. In such situations, the adder 260 can accordingly be disabled to avoid it drawing power, thereby resulting in a lower power consumption for the comparison operation when compared with typical prior art approaches.

Figure 6:
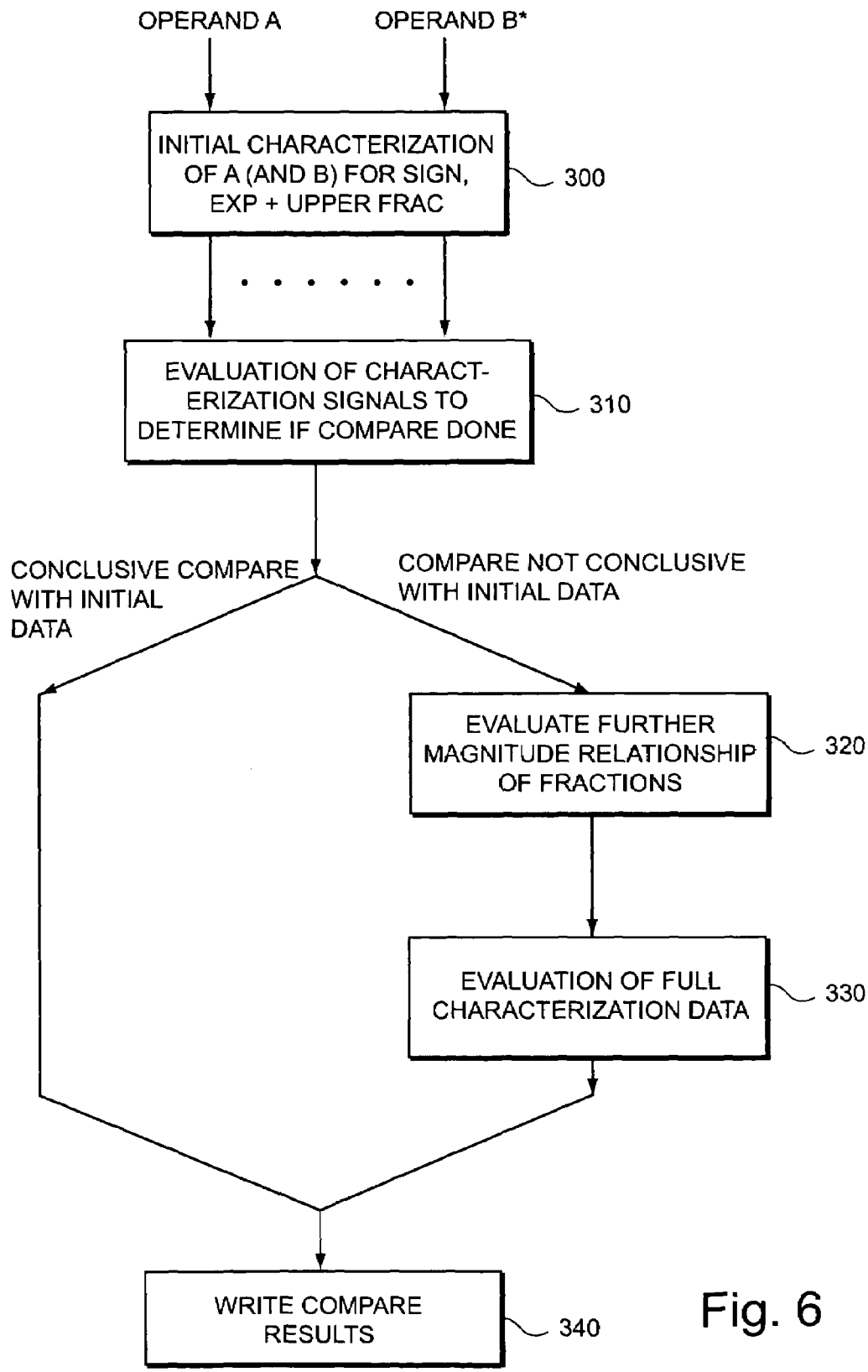
FIG. 6 is a flow diagram illustrating the processing performed by the logic of FIG. 3 in accordance with one example embodiment.

FIG. 6 is a flow diagram illustrating the processing performed by the logic of FIG. 3. At step 300 an initial characterisation of operands A and B is performed by the first processing logic 200 based on the sign component, exponent component, and a certain number of upper significant bits of the fraction component. An asterisk is included against the input operand B in FIG. 6, since the operand B is not always required. In particular, the logic of FIG. 3 can be used to compare operand A against zero, in which case at step 300 the first processing logic 200 would be arranged to merely perform an initial characterisation of the operand A for the sign, exponent and upper bits of the fraction.

The process then proceeds to step 310, where the evaluation logic 230 evaluates the various characterisation signals in order to evaluate whether the comparison result can be determined. It should be noted that if the operand A is being compared against zero, then it always possible to determine the comparison result at this point.

Following step 310, the process then proceeds in one of two ways. If the evaluation logic determines at step 310 that the comparison result can be determined from the characterisation signals produced at step 300, then the comparison result is determined at that time, with the comparison result being written at step 340. However, if it is determined that the comparison cannot conclusively be determined based solely on the signals produced at step 300, then the process branches to step 320, where a further evaluation of the magnitude relationship of the fractions is performed. As discussed earlier with reference to FIG. 3, this is performed by the adder 260. Thereafter, at step 330, the evaluation logic 230 then determines the comparison result based on the full characterisation data, with the process then proceeding to step 340 to write the comparison result.

From the above description, it will be appreciated that the logic provided in accordance with preferred example embodiments to compare first and second floating point operands enables comparison results to be generated significantly more quickly, and with significantly less power consumption, than the known prior art techniques, in situations where it is not required for the comparison result to always be available in a fixed number of cycles.

Although a particular embodiment has been described herein, it is not limiting thereto, and that many modifications and additions may be made. For example, various combinations of the features of the following dependent claims could be made with the features of the independent claims.

We claim:

1. A data processing apparatus for comparing first and second floating point operands to produce a comparison result, each first and second floating point operand having a sign component, an exponent component and a fraction component, the data processing apparatus comprising:

first processing logic circuitry configured to receive, for each floating point operand, a first component derived from a predetermined number of most significant bits of the fraction component of that floating point operand, said predetermined number being less than the total number of bits constituting the fraction component, the first processing logic circuitry being further configured to receive the sign components and the exponent components of the first and second floating point operands, to compare the sign components, the exponent components and the first components of the first and second floating point operands, and to produce a plurality of signals indicative of the comparison;

evaluation logic circuitry configured to evaluate whether the comparison result is determinable from the plurality of signals, and if so, to determine the comparison result;

second processing logic circuitry configured, in the event that the evaluation logic circuitry determines that the comparison result is not determinable from the plurality of signals, to receive, for each floating point operand, a second component derived from at least the bits of the fraction component of that floating point operand other than said predetermined number of most significant bits, and to compare the second components of the first and second floating point operands in order to produce at least one further signal indicative of said comparison; and the evaluation logic circuitry being further configured to determine the comparison result from said plurality of signals and said at least one further signal.

2. A data processing apparatus as claimed in claim 1, wherein, for each floating point operand, said first component comprises said predetermined number of most significant bits of the fraction component of that floating point operand.

3. A data processing apparatus as claimed in claim 1, wherein, for each floating point operand, said first component comprises a number of most significant bits of a significand derived from said predetermined number of most significant bits of the fraction component.

4. A data processing apparatus as claimed in claim 1, wherein, for each floating point operand, said second component comprises said at least the bits of the fraction component of that floating point operand other than said predetermined number of most significant bits.

5. A data processing apparatus as claimed in claim 1, wherein, for each floating point operand, said second component comprises a number of bits of a significand derived from said at least the bits of the fraction component of that floating point operand other than said predetermined number of most significant bits.

6. A data processing apparatus as claimed in claim 1, wherein, for each floating point operand, the second component is derived from all bits of the fraction component of that floating point operand.

7. A data processing apparatus as claimed in claim 1, wherein the second floating point operand is zero, and the plurality of signals produced by the first processing logic are sufficient to enable the evaluation logic circuitry to determine the comparison result.

8. A data processing apparatus as claimed in claim 1, wherein the exponent component of each floating point operand as compared by the first processing logic circuitry has a modified bias value associated therewith which is modified with respect to an original bias value associated with the exponent component as received by the data processing apparatus.

9. A data processing apparatus as claimed in claim 1, wherein the first processing logic circuitry comprises sign evaluation logic circuitry configured to produce a first sign signal which is set if the sign components of the first and second floating point operands are different, and a second sign signal indicating, in the event that the first sign signal is set, which sign component is positive.

10. A data processing apparatus as claimed in claim 1, wherein the first processing logic circuitry comprises exponent evaluation logic circuitry configured to produce a first exponent signal which is set if the exponent components of the first and second floating point operands are different, and a second exponent signal indicating, in the event that the first exponent signal is set, which exponent component is larger.

11. A data processing apparatus as claimed in claim 10, wherein the exponent evaluation logic circuitry is further configured to produce one or more further exponent signals indicating the presence of one or more predetermined exponent conditions.

12. A data processing apparatus as claimed in claim 1, wherein the first processing logic circuitry comprises first component evaluation logic circuitry configured to produce a first first component signal which is set if the first components of the first and second floating point operands are different, and a second first component signal indicating, in the event that the first first component signal is set, which first component is larger.

13. A data processing apparatus as claimed in claim 12, wherein the first component evaluation logic circuitry is further configured to receive the fraction components of the first and second floating point operands and to produce one or more additional signals indicating whether either of the fraction components are zero.

14. A data processing apparatus as claimed in claim 1, wherein the second processing logic circuitry is configured to produce as said at least one further signal a second component signal indicating which second component is larger.

15. A method of operating a data processing apparatus to compare first and second floating point operands to produce a comparison result, each first and second floating point operand having a sign component, an exponent component and a fraction component, the method comprising the steps of:
(a) receiving at first processing logic circuitry, for each floating point operand, a first component derived from a predetermined number of most significant bits of the fraction component of that floating point operand, said predetermined number being less than the total number of bits constituting the fraction component, the first processing logic circuitry also receiving the sign components and the exponent components of the first and second floating point operands;
(b) employing the first processing logic circuitry to compare the sign components, the exponent components and the first components of the first and second floating point operands, and to produce a plurality of signals indicative of the comparison;
(c) evaluating whether the comparison result is determinable from the plurality of signals, and if so, determining the comparison result;
(d) in the event that at said step (c) it is determined that the comparison result is not determinable from the plurality of signals, receiving at second processing logic circuitry, for each floating point operand, a second component derived from at least the bits of the fraction component of that floating point operand other than said predetermined number of most significant bits;
(e) employing the second processing logic circuitry to compare the second components of the first and second floating point operands in order to produce at least one further signal indicative of said comparison; and
(f) determining the comparison result from said plurality of signals produced at said step (b) and said at least one further signal produced at said step (e).

16. A method as claimed in claim 15, wherein, for each floating point operand, said first component comprises said predetermined number of most significant bits of the fraction component of that floating point operand.

17. A method as claimed in claim 15, wherein, for each floating point operand, said first component comprises a number of most significant bits of a significand derived from said predetermined number of most significant bits of the fraction component.

18. A method as claimed in claim 15, wherein, for each floating point operand, said second component comprises said at least the bits of the fraction component of that floating point operand other than said predetermined number of most significant bits.

19. A method as claimed in claim 15, wherein, for each floating point operand, said second component comprises a number of bits of a significand derived from said at least the bits of the fraction component of that floating point operand other than said predetermined number of most significant bits.

20. A method as claimed in claim 15, wherein, for each floating point operand, the second component is derived from all bits of the fraction component of that floating point operand.

21. A method as claimed in claim 15, wherein the second floating point operand is zero, and the plurality of signals produced by the first processing logic circuitry are sufficient to enable the comparison result to be determined at said step (c).

22. A method as claimed in claim 15, wherein at said step (b) the exponent component of each floating point operand compared by the first processing logic circuitry has a modified bias value associated therewith which is modified with respect to an original bias value associated with the exponent component as received by the data processing apparatus.

23. A method as claimed in claim 15, wherein said step (b) comprises the step of:
comparing the sign components of the first and second floating point operands to produce a first sign signal which is set if the sign components are different, and a second sign signal indicating, in the event that the first sign signal is set, which sign component is positive.

24. A method as claimed in claim 15, wherein said step (b) comprises the step of:
comparing the exponent components of the first and second floating point operands to produce a first exponent signal which is set if the exponent components are different, and a second exponent signal indicating, in the event that the first exponent signal is set, which exponent component is larger.

25. A method as claimed in claim 24, wherein said step (b) further comprises the step of producing one or more further exponent signals indicating the presence of one or more predetermined exponent conditions.

26. A method as claimed in claim 15, wherein said step (b) comprises the step of:
comparing the first components of the first and second floating point operands to produce a first first component signal which is set if the first components are different, and a second first component signal indicating, in the event that the first first component signal is set, which first component is larger.

27. A method as claimed in claim 26, wherein said step (b) further comprises the step receiving the fraction components of the first and second floating point operands and producing one or more additional signals indicating whether either of the fraction components are zero.

28. A method as claimed in claim 15, wherein said step (e) comprises the step of comparing the second components of the first and second floating point operands to produce as said at least one further signal a second component signal indicating which second component is larger.

* * * * *